SPHERICAL BEARING AND METHOD OF MAKING THE SAME

Original Filed June 20, 1968

INVENTORS
HOWELL L. POTTER
RICHARD J. MATT
BY RONALD E. RESTELLI
Hoppgood & Calimafde
ATTORNEYS United States Patent Office Re. 27,778
Reissued Oct. 9, 1973

27,778
SPHERICAL BEARING AND METHOD OF MAKING THE SAME

Howell L. Potter, New Britain, Richard J. Matt, West Simsbury, and Ronald E. Restelli, Cromwell, Conn., assignors to Textron, Inc., Providence, R.I.

Original No. 3,583,775, dated June 8, 1971, Ser. No. 738,515, June 20, 1968. Application for reissue June 30, 1972, Ser. No. 268,192
Int. Cl. B21d *53/10;* F16c *1/06*
U.S. Cl. 308—72 15 Claims

Matter enclosed in heavy brackets [ ] appears in the original patent but forms no part of this reissue specification; matter printed in italics indicates the additions made by reissue.

ABSTRACT OF THE DISCLOSURE

A spherical bearing is described wherein a ball member is retained and supported by a hardened spherical seat, the latter being defined by an insert bushing that is integrated into a socket structure.

The bushing with a truncated bearing ball nested by the inner bushing surface is fusion welded around the outer periphery of the bushing to a housing to form an integral load-carrying part thereof. The fusion weld also extends a substantial axial distance or depth and is preferably made with an energized beam such as a beam of electrons. In the formation of a spherical bearing for a rod end, a pair of annular bushings is formed with each bushing welded to the rod end housing to form an integral load-carrying part of the rod end.

This invention relates to a spherical bearing assembly and particularly to a self-aligning spherical bearing assembly and method of assembling the same wherein the outer race member comprises a hardened material.

Spherical bearing assemblies comprise a number of different types which are assembled by a number of different methods. One method, called swaging, has the outer race of the bearing formed of a material having a low yield point which is then press formed around a hardened steel ball. A difficulty with this type of bearing assembly and method of assembling the same is that the choice of material of the bearing member is restricted since the inner bearing member must be hard enough to serve as a die while the outer race must be soft enough to form. With this method of assembly it is not possible to use balls of softer materials such as porous lubricant-impregnated balls, or very hard outer race members which cannot tolerate the working needed to form the outer race around the ball.

Another known method for making a spherical bearing involves forming the outer race member of two annular rings which nest the ball between them, the rings being retained in a housing. The annular members are held to the housing by a press fit within a recess provided therefore in the housing, or by swaged deformation of the housing to retain the annular inserts. Such bearings again suffer from the disadvantage that the outer race member is formed of a formable material; they preclude the use of a thoroughly hardened housing and outer race surface. Furthermore, the reliance upon a press members reduces the capability of the bearing to absorb loads parallel to the ring axis and the ball is likely to pop out of the bearing.

Still another bearing construction involves shaping the ball by providing thereon oppositely disposed cylindrical sections which separate oppositely disposed spherical portions. The ball is inserted edgewise into a raceway and turned therein to obtain axial retention of the bearing. The ball is extensively deformed to enable its placement in the annular raceway. As a result, a significant amount of axial load-bearing capability is lost.

It is therefore an object of this invention to provide a spherical bearing structure wherein maximum load-bearing capability is achieved with minimum physical dimensions.

It is a further object of this invention to provide a high temperature spherical bearing structure wherein race surfaces of substantially elevated hardness are provided.

It is still further an object of this invention to provide a high-load-carrying spherical bearing of lightweight construction.

These objects are accomplished by object of as hereafter described in conjunction with the drawings wherein.

Briefly stated our invention contemplates forming a spherical bearing in a housing wherein a spherical raceway is divided is not at least two portions, one of which is formed at the inner surface of an annular bushing which nests a ball upon assembly in the housing and is fusion welded to the housing.

Figure 1:
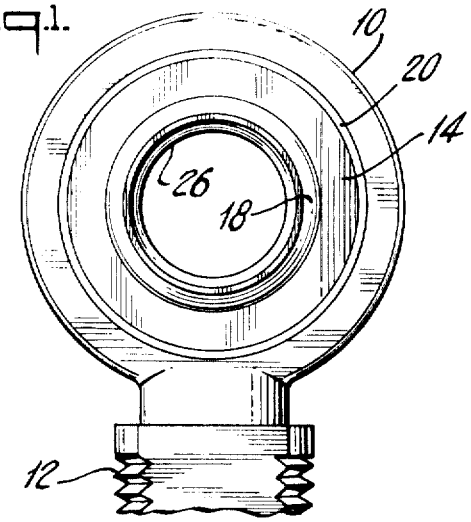
FIG. 1 is a front view of a rod end made according to the invention.
Figure 3:
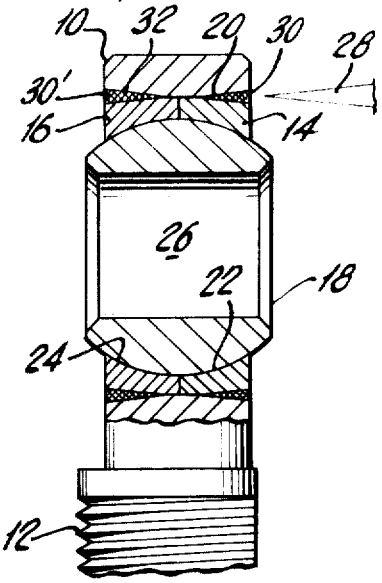
FIG. 3 is a side view of the assembled rod end, partly broken away and in section in the plane 2—2 of FIG. 1.

In FIG. 1, a rod end is shown with a socket housing 10 at one end, and with a threaded shank 12 at the other end, for connecting to an associated operating part, not shown. The socket housing is generally annularly shaped. Within the housing 10 is a bore into which is inserted a pair of annular bushings 14—16, only one of which, 14, is visible in the view of FIG. 1. A truncated ball 18 is nested between the bushings 14—16 as is shown in FIG. 3. An annular fused zone 20 is formed at the periphery of the bushing 14 and along the annular seam formed between the bushing 14 and the wall of the bore. The inner surfaces of the annular bushings 14–16 are shaped and sized to form, when coaxially placed adjacent one another a truncated spherically shaped bearing ball seat.

In the formation of the spherical bearing of FIG. 1, the housing 10 is formed of a material preferably selected for its fine grain and high strength to permit it to carry a major portion of the load. The grain size of the socket housing 10 is preferably selected to be about ASTM 5 or smaller to avoid cracking near the weld zone in the heat-affected region. A bore 11 formed therein is preferably concentrically located within the housing and may be formed by a simple drill operation. The bore 11 is thus straight cylindrical.

Figure 2:
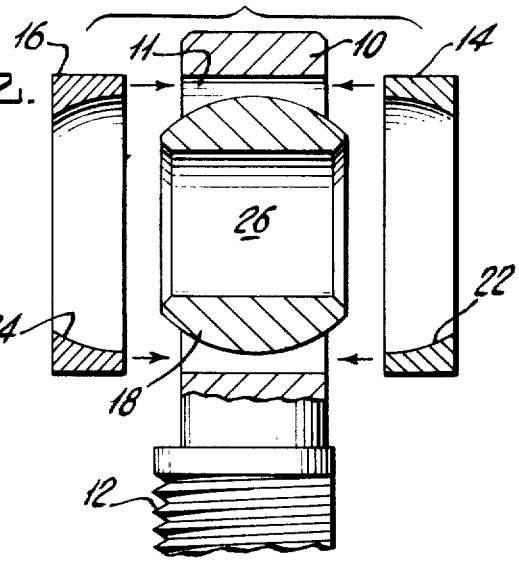
FIG. 2 is an exploded view of the rod end of FIG. 1 prior to assembly, parts being broken and shown in section in the plane 2—2 of FIG. 1.

The bushings 14–16 in FIG. 2 are preferably alike and are formed of a material, such as stainless steel, selected for its high wear resistance. The inner surfaces 22–24 of the bushings are so formed as to provide, when assembled, half mating portions of a truncated spherical raceway. The radius of curvature of the raceway portions 22–24 is selected to provide a tight fit with the ball 18 upon assembly in the bore 11. The outer surfaces of the bushings are straight-cylindrical and sized to form a tight annular seam with slight interference with the inner annular wall of the bore 11; in the case of 1-inch diameter bore 11, this interference is in the order of about 0.0001 inch.

After formation of the insert rings, they are final hardened to about Rc 30–36 by a suitable heat-treating process such as placement within an oven kept at hardening temperatures; alternatively, where surface-hardening techniques are used, essentially only the spherical raceway surface is hardened, for instance by induction heat treatment and quenching.

The ball 18 is formed with a central 26 for mounting to a pin, stud or the like, not shown. The ball is made of hardenable material and is hardened, say, to Rc 53–58, before assembly.

To assemble the bearing, the annular bushings 14–16 are pressembled with a slight press fit in the bore 11 with the ball 18 nested between them. Care must be taken that the walls of the seam are free of contamination and have a low RMS finish. The bushings may be tack welded into place to avoid distortions during the subsequent seam welding.

An energized beam of charged particles such as a beam of electrons 28 is axially directed at the seam 30, i.e., at the fit of insert 14 in bore 11. The beam 28 is so focused at the seam 30 that adjacent sides thereof may be fused. The power of the beam is adjusted to fuse the adjacent walls to a depth which is preferably selected to extend over a substantial portion of the axial width of a bushing. As shown in FIG. 3, the fused zone or cast metal portion 20 extends to about 80 percent of the thickness or width of the bushing 14. The annular weld is formed by either deflecting the beam or rotating the housing 10, and the beam power is adjusted in consideration of the welding speed to assure that the weld extends to the desired depth. Upon completion of the welding of the bushing 14 to the housing 10 and after cooling of the assembly, the beam is directed at the opposite axial side 30' of the seam, i.e. between bushing 16 and bore 11, to establish an annular weld zone 32 similar to zone 20.

Upon completion of the welding operation, the original tight fit of the ball 18 with the spherical raceway is automatically relieved by shrinking action inherent in the cooling of the cast metal, to provide a freely movable bearing ball. The conventional additional step of freeing the ball has been eliminated. Beam focus and power are controlled to select the width of the fusion zone and thus the amount of shrinkage to free the ball. Moreover, by limiting beam penetration to the approximately 80 percent figure noted, the concentric positioning action of the interference fit of bushings 14–16 in bore 11 is never lost; it remains to assure a central zone of radial-load support, unaffected by the welds.

Although an electron beam can be adjusted to weld the entire axial seam 30–30' in one annular sweep, the preferred and more controllable operation is performed in the two-welding step as described above, leaving a central zone unaffected by welding.

The beam may be slightly radially offset relative to the seam to favor fusing the bushing and reducing the fusion of housing material. It will be understood that slight variations in this radial offset will establish the degree of "free-up" or clearance upon weld cooling.

Figure 4:
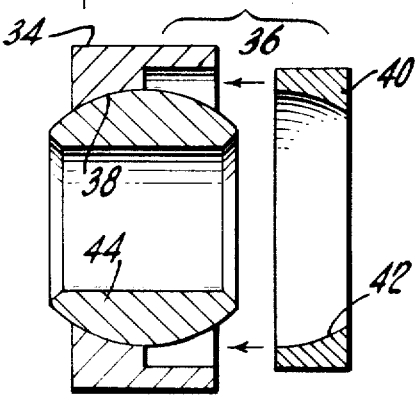
FIG. 4 is a view similar of FIG. 2 to show a modification.

FIG. 4 illustrates a more generally spherical bearing assembly. In this figure, an annular housing 34 is provided with a counter bore 36 and a truncated spherically shaped inner seat 38. The spherically shaped wall 38 may be face-hardened by flame hardening or by the addition of a hard coating thereon. The housing 34 generally is made of a material having a high strength characteristic.

An annular bushing 40 is formed having an outer diameter selected to form a tight seam when assembled in the counter-bore 36 and is provided at the inner surface with a truncated spherically shaped raceway 42. The inner surfaces 38–42 form a similar truncated unitary spherical raceway as the inner surfaces 22–24 of the bushings 14–16. The bushing 40 may be hardened prior to assembly within the counterbore 36.

A hardened bearing ball 44 is formed or selected with a diameter to snugly fit within the truncated spherical raceway formed by the bushing inner surface 42 and the housing surface 38. The FIG. 5 illustrates the assembly with the ball nested between the housing 34 and the bushing 40.

Figure 5:
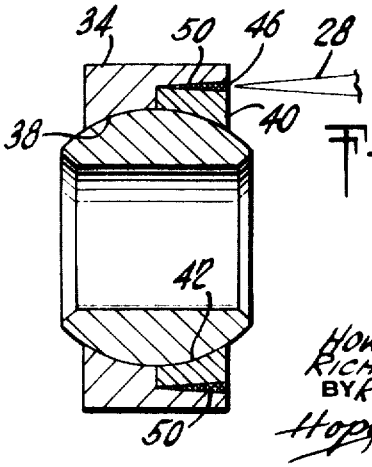
FIG. 5 is a view similar to FIG. 3 to show the assembled modification of FIG. 4.

After the preassembly of the bearing elements as shown in FIG. 5 a beam of electrons 28 is directed at the seam 46 formed between the bushing and the inner wall of the counter-bore 36. The focus and power of the beam are adjusted to fuse and weld the bushing 40 to the housing 34. Preferably the axial depth of the weld zone 50 extends throughout the axial width of the bushing 40. Upon completion of the annular weld, the ball 44 is free to move within the truncated spherical raceway.

Figure 6:
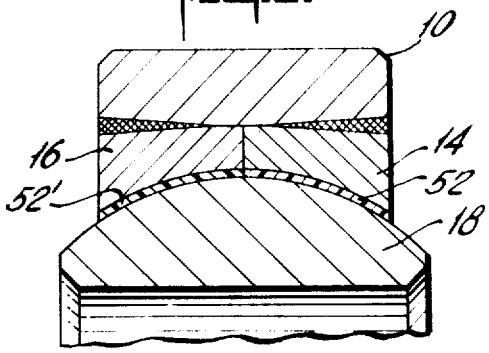
FIG. 6 is an enlarged longitudinal sectional view of a portion of a rod end according to a further modification.

The spherical bearing of this invention may be advantageously provided with a raceway liner exhibiting a desired characteristic and which may be generally non-deformable. FIG. 6 illustrates a rod end bearing provided with such liner. Each of the annular bushings 14–16 has its inner truncated spherical raceway face-hardened with a liner 52–52'. These liners may be provided by addition of a heat-resistant hardened brittle material such as obtained by the flame spraying of tungsten carbide. Where a slippery low friction surface is desired, a dry film may be employed such as a liner composed of tetrafluoroethylene or nylon. The liners are applied after the formation of the bushings 14–16 and the liner thicknesses are taken into account in determining the diameter of the truncated spherical raceways of the bushings. Damage to the liners is entirely avoided during assembly since the high-speed electron beam welding avoids excessive heat buildup and eliminates the prior art cold swaging step.

Other high temperature dry film lubricants, and/or corrosion- and abrasion-resistant coats can be applied to the race surfaces. Aluminum oxide, chrome carbide films and the like are possible with the bearing construction of my invention.

The electron-beam-welded construction permits the use of any desired race finish, whether machined, ground or polished, and further permits accurate control of race geometry with or without lubricating grooves. A smoothly finished race increases the actual load-carrying contact area, reduces wear and the tendency to score and gall. The welding of the inserts to the housing results in an increase of the load-carrying capacity of the bearing for a given weight, since the insert becomes an integral part of the load-carrying part of the housing.

Having thus described our invention, we claim:

[1. A self-aligning spherical bearing assembly comprising a metallic load-carrying housing having a bore, a bearing ball, an annular metallic bushing mounted within the bore and provided at the inner surface thereof about an axis with a truncated spherically shaped raceway sized to snugly nest the ball, said bushing having a substantial axial portion of its peripheral side fused to the wall of the bore to form an integral load-carrying part of the housing.]

[2. A bearing assembly according to claim 1, wherein at least the raceway portion of said bushing is relatively hard and non-ductile.]

[3. A self-aligning spherical bearing assembly a truncated bearing ball having a continuous hardened running surface, a metallic rod end housing having a bore, a pair of like metallic bushings each having at its inner surface a half portion of a truncated spherically shaped raceway sized to snugly nest the bearing ball, said bushings having a combined axial width less than the ball diameter for axial protrusion thereof, said bushings further being mounted in the bore with said ball nested in the raceway, the peripheral outer side of each bushing being fused to the bore wall along a substantial axial portion to form an integral load-carrying part of the rod end.]

[4. The device as recited in claim 3, wherein the bore is straight-cylindrically shaped.]

[5. The device as recited in claim 3, wherein each of said race surfaces of said bushings is provided with a liner.]

[6. The device as recited in claim 3, wherein each of said race surfaces of said bushings is provided with a nondeformable, brittle, high temperature-resistant hardened surface material.]

7. A metallic method for making a self-aligning spherical bearing comprising selecting a bearing ball, forming a metallic load-carrying housing having a bore, forming an annular metallic bushing with a truncated spherically shaped inner raceway and an outer peripheral wall sized to fit within the bore, said inner raceway being sized to snugly nest the ball, placing the bushing within the bore with the ball nested in the raceway, the peripheral wall of the bushing and the bore wall forming an axially extending annular seam.

directing an energized beam generally at the same to melt adjacent sides thereof to an axial depth extending to a substantial portion of the axial width of the bushing to weld said bushing to the load-carrying housing and form an integral part thereof.

8. The method as recited in claim 7, wherein said seam-welding step further comprises directing a focused beam of electrons generally at said seam to fuse said adjacent seam walls to a preselected depth.

9. The method as recited in claim 7, wherein said bushing-forming step further includes coating the spherically formed inner surface of the bushing with a brittle, high-temperature-resistant hardened material.

10. A method of making a self-aligning spherical bearing comprising selecting a truncated bearing ball having a continuous hardened running surface, forming a metallic load-carrying housing of preselected width with a bore extending through the width dimension thereof, forming a pair of like metallic bushings with annular inner surfaces thereof provided with mating halves of a truncated spherically shaped hardened raceway sized to snugly nest the selected ball between the annular raceway portions, with the axial width of the bushings less than the diameter of the ball, and the peripheral outer surfaces of the bushings sized to snugly fit within the bore, placing said bushings within the bore with the ball nested within the annular raceway formed by the mated raceway portions, and with the peripheral outer walls of the bushings forming a seam with the inner surface of the bore, and directing an energized beam generally at the seam to fuse said bushings to the bore along a substantial axial length thereof to form an integral load-carrying part of the housing.

11. The method as recited in claim 10, wherein the bushing, forming step further includes forming the spherical raceway portion with a diameter slightly less than said ball diameter to provide a slight interference fit between said ball and said bushings, and freeing said ball within the spherical raceway with a preselected tolerance of radial clearance by controlling the width of the fusion zone along said seams.

12. The method as recited in claim 10, wherein the fusion step further comprises directing a focused beam of electrons at the seam to fuse the sides thereof to preselected depth.

13. The method as recited in claim 12, wherein said fusion step still further comprises directing the beam of electrons along a first axial direction at the seam formed by a first of said bushings and the bore wall and fusing the peripheral outer wall of the first bushing to a substantial axial depth, and directing the beam of electrons along a second axial direction opposite said first direction at the seam formed by the second of said bushings and the bore wall and fusing the peripheral outer wall of the second bushing to a substantial axial depth.

14. The method as recited in claim 12, wherein said beam of electrons fuses the seams to a depth extending to about 80 percent of the axial widths of said bushings.

15. The method as recited in claim 9, wherein said bushing-forming step further includes coating said truncated spherically shaped raceways with a liner material.

16. The method as recited in claim 15, wherein said bushing-forming step further includes hardening said raceways by coating thereon a nondeformable, brittle, high-temperature-resistant, hardened material.

17. The method as recited in claim 16, wherein said coated material is selected from the group consisting of tungsten carbide, chrome carbide and aluminum oxide.

[18. A bearing assembly according to claim 1, in which the bore and the outer surface of said bushing are both cylindrical and snugly nested, and wherein the axial extent of fusion of said surfaces is less than the full extent of axial overlap of said surfaces.]

*19. A self-aligning spherical bearing assembly comprising a metallic load-carrying housing having a cylindrical bore, a pair of like metallic bushings having outer cylindrical surfaces in closely nested and concentrically supported relation in said bore, the inner surfaces of said bushings being spherically concave and concentric in their nested relation, a truncated bearing ball having nested self-aligning support in the concave surfaces of said bushings, the axially overlapping nested cylindrical surfaces being circumferentially continuously fusion-welded to an axial extent which is substantially the full axial extent of overlap inwardly from the axially outer ends of overlap but which is short of the full axially inward extent of said bushings.*

*20. The bearing assembly of claim 19, in which the axially inward extent of welding is substantially 80 percent of the axial extent of each of said bushings.*

*21. The bearing assembly of claim 19, in which the radial thickness of the welds is greatest at the axially outer limits of cylindrical-surface overlap and reduces as a function of axially inward offset from said limits.*

*22. A self-aligning spherical bearing assembly comprising a metallic load-carrying housing having a bore which at the axially central region is a circumferentially continuous cylindrical bore, a pair of like metallic bushings having concave inner surfaces which define matched parts of a single spherical surface when the axially inner ends of said bushings are abutted and aligned, the outer surfaces of said bushings in the region of said axially inner ends being circumferentially continuously cylindrical to match the cylindrical-bore radius of said region and being assembled in concentrically supported axial overlap with the cylindrical bore at said central region, a truncated bearing ball having nested self-aligning sup-*

*port in the concave surfaces of said bushings, and separate circumferentially continuous fusion welds uniting the axially overlapped regions of said bushings and bore axially outward of said central region.*

References Cited

The following references, cited by the Examiner, are of record in the patented file of this patent or the original patent.

FOREIGN PATENTS 552,261 11/1956 Italy ---------- 308—72

CHARLES J. MYHRE, Primary Examiner

F. SUSKO, Assistant Examiner

U.S. Cl. X.R.

29—149.5